May 26, 1970  J. F. NELSON  3,513,875
CLOSURE DEVICE
Filed March 14, 1968
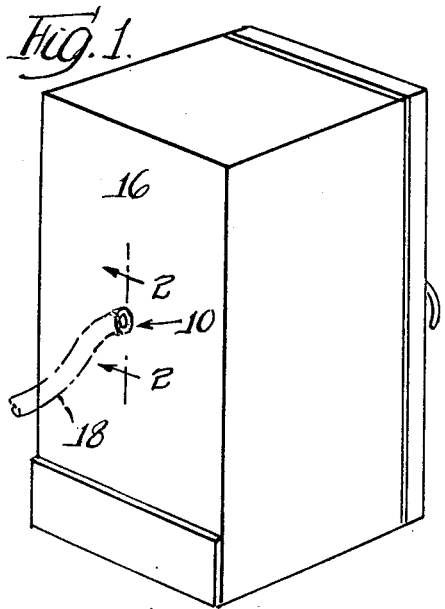
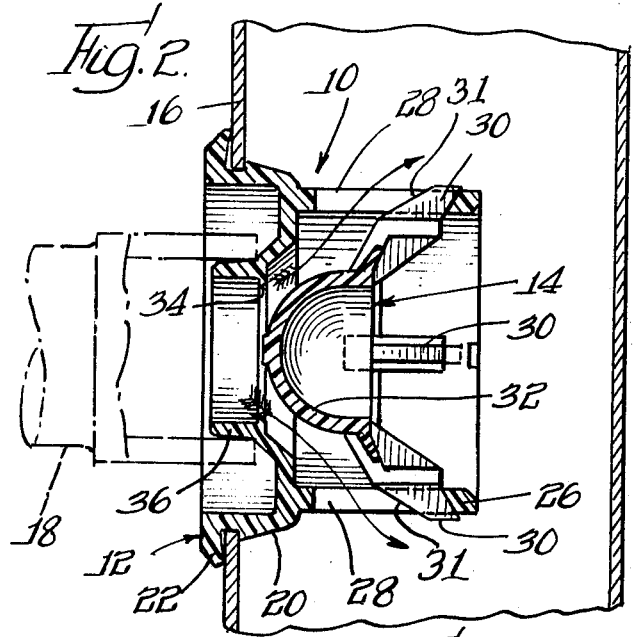
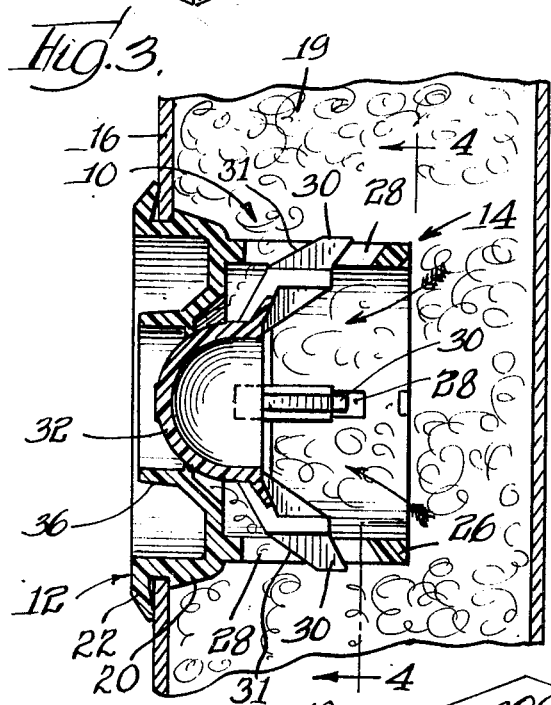
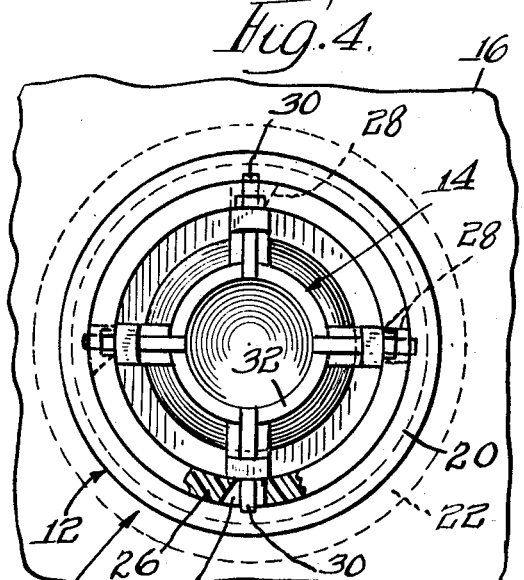
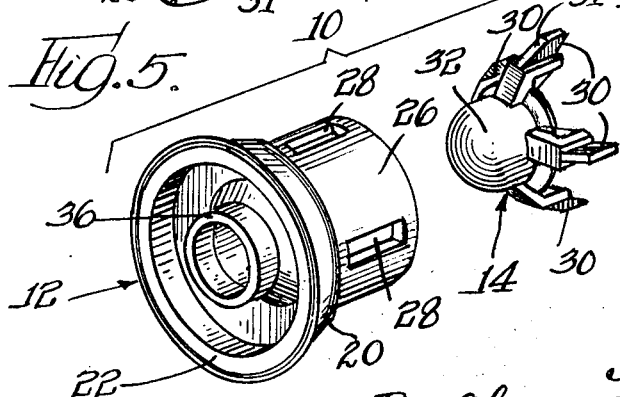
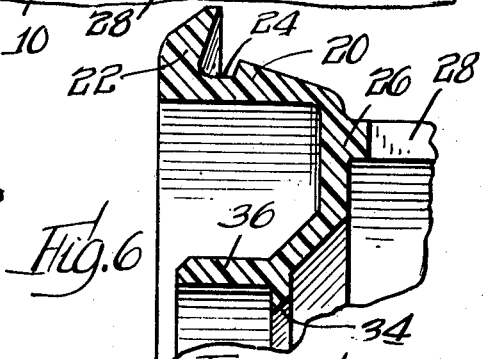
Inventor
John F. Nelson
By: Olson, Trexler, Wolters & Bushnell attys United States Patent Office 3,513,875
Patented May 26, 1970

1

3,513,875
CLOSURE DEVICE
John F. Nelson, Des Plaines, Ill., assignor to Illinois Tool Works Inc., Chicago, Ill., a corporation of Delaware
Filed Mar. 14, 1968, Ser. No. 713,194
Int. Cl. F16k 15/06
U.S. Cl. 137—528                       9 Claims

ABSTRACT OF THE DISCLOSURE

The present invention relates generally to aperture closure devices and more particularly to improvements in closure devices which may be snapped within the aperture of a panel, and in this position permit the flow therethrough of filler material such as foam insulation material commonly employed for insulating refrigerators. To this end the present invention contemplates a fitting which will only permit the free-flow of insulating material in one direction, and will also prevent unauthorized reverse flow of the filler material. The embodiment disclosed herein consists of a two part assembly, a first part or fitting in the nature of an annulus being adapted for telescopic assembly and interlocking association within the aperture of a panel, as for example, within an aperture of the outer shell of a refrigerator. A second part, in the form of a valve member is carried by and axially shiftable within said fitting. The valve member is shiftable in response to the flow of material in the fitting, and in one shifted position said valve member is adapted to sealingly engage a valve seat in the fitting, and in another shifted position to be disengaged from said valve seat so as to permit free flow of the material to said fitting.

---

It is an object of the present invention to provide a closure device to be used in association with the panel or outer shell of a refrigerator through which insulation material may flow freely from a source of supply until the chamber surrounding or capsulating the refrigerator has been completely sealed, at which time a valve member will sealingly engage a valve seat in the fitting automatically, and thereby prevent unauthorized reverse flow of the insulation material.

It is a further object of the present invention to provide a closure device which may be produced very economically and to this end the invention contemplates a simple two-part device which may be produced by employing conventional plastic molding methods.

It is another object of the present invention to provide an improved closure device of the type referred to above, wherein each of the two parts may be made independently and then readily assembled as a complete unit.

The feregoing, and other objects and advantages will be more apparent from the following detailed description when considered in connection with the accompanying drawing, wherein:

FIG. 1 is a perspective view of a conventional refrigerator having the rear panel thereof equipped with a closure device of the type contemplated by the present invention;

FIG. 2 is an enlarged fragmentary sectional view taken substantially along the line 2—2 of FIG. 1, disclosing the shiftable valve member in its unseated or open position;

FIG. 3 is a view similar to FIG. 2 showing the shiftable valve member sealingly engaging the complementary seat in the part or fitting attached to the refrigerator shell;

FIG. 4 is an end elevational view of the closure device as seen along the line 4—4 of FIG. 3;

2

FIG. 5 is a perspective view showing the annular fitting and valve member before being assembled as a unit; and FIG. 6 is an enlarged fragmentary sectional view of the upper left hand portion of the closure device as seen in FIG. 2.

Referring now to the drawing more in detail, wherein like numerals have been employed to designate similar parts throughout the various figures, it will be seen that an aperture closure device of the type contemplated by the present invention is designated generally by the numeral 10. The closure device 10 comprises two discrete elements, namely an annular part or fitting designated generally by the numeral 12 and a valve member designated generally by the numeral 14. The outer periphery of the fitting 12, at the extremity thereof, is adapted to interlock with the marginal area which defines an aperture in a panel or shell member 16 as clearly shown in FIGS. 2 and 3. A conduit or hose 18 is commonly employed to direct insulation material 19 into the encapsulating chamber of the refrigerator unit.

An annular section of the fitting 12 adapted to be snapped into the aperture of the panel 16 is designated by the numeral 20. The peripheral surface of the section 20 tapers so as to facilitate initial registration with and ultimate insertion into the aperture in the panel. The fitting 12 is preferably made of suitable firm yet yieldable plastic material, and thus as the section 20 is forced into the aperture of the panel 16, the material of the section 20 yields sufficiently to permit the trailing extremity to yield and subsequently spring outwardly into interlocked relationship with the inner surface of the panel 16. A flange section 22 also yields slightly as it engages the outer surface of the panel 16 to permit registration and interlocking of the panel 16 within an annular recess 24 presented between the sections 20 and 22. In this manner the fitting 10 is firmly held in the panel 16 in readiness to receive the discharge end of the conduit 18.

An annular extension 26 of the fitting 12 is provided with a plurality of equally spaced slots 28. These slots 28 are adapted to accommodate radial fins 30 of the valve member 14. In order to bring the fins or vanes 30 into registration with their respective or complementary slots 28, it is only necessary to telescopically associate the valve 14 with the annular extension 26 of the fitting 12.

The fitting 12 is provided with an annular section or projection 36 adjacent the valve seat 34 for accommodating the hose or conduit 18 as clearly illustrated by dot-and-dash lines in FIG. 2. The opposite extremity of the conduit 18 is connected with supply means (not shown) for directing insulation material into the fitting 12. This causes the valve member 14 to shift to its open position shown in FIG. 2, thereby permitting the filler or insulation material to be directed into the encapsulating area surrounding the refrigerator. When the specified amount of insulation material has been dispensed through the conduit 18, it may then be disconnected from the annular section of flange 36. As the insulation material expands through its normal chemical reaction, the tendency for the filler material to flow outwardly or in reverse direction through the fitting 12 causes the valve member 14 to be moved to its seated or closed position shown in FIG. 3.

From the foregoing, it will be apparent that the present invention provides a very simple yet efficiently operable closure means which will permit filler material to be introduced within an area, such as the encapsulating area surrounding a refrigerator with minimum effort. Heretofore it has been found difficult to handle filler material of the type described without experiencing an overflow of material in the vicinity of the panel aperture. Applicant's improved closure device functions automatically to close the valve, thus precluding the possibility of any objectionable overflow.

As previously mentioned, each of the parts, namely the fitting and valve member, are so designed as to permit their being produced by practicing conventional plastic molding methods. The "spider" arrangement of the valve member greatly facilitates the ease with which the arms radiating from the central valve section may be sprung inwardly as an incident to telescopic association within the fitting extension or sleeve section. This "spider" structure permits free flow of filler material through the fitting and reduces to a minimum the amount of plastic material required to form the valve member. A closure device constructed in accordance with the teachings of the present invention is not only efficiently operable, but very economical to produce.

The invention is claimed as follows:

1. A closure device for telescopic association with an aperture of a workpiece such as a panel defining one wall of a chamber, including a fitting in the nature of an annulus having peripheral panel-interlocking means, said annulus when in panel-interlocking position, being substantially flush with the outer surface of a complementary panel, an intake section for attachment to a material supply means such as a supply conduit, said fitting also including a valve seat and an axial extension for supporting a shiftable valve member, and a valve member axially and freely shiftable in opposite directions within said extension, said valve member being shiftable to an open position in response to the pressure of material in one direction to permit free flow of filling material through the fitting, and to a closed position sealingly engaging said valve seat in response to pressure of said material in an opposite direction, said valve seat, valve member and extension being axially insertable as a unit within the panel aperture in a direction toward the chamber defined by the panel.

2. A closure device as set forth in claim 1 wherein the fitting extension is peripherally recessed to slidably accommodate a complementary peripheral section of the valve member.

3. A closure device as set forth in claim 2 wherein the complementary peripheral section of the valve member includes radially projecting elements telescopically associated with the recessed portion of the fitting extension.

4. A closure device as set forth in claim 3 wherein the recessed portion of the fitting extension consists of longitudinal slots for accommodating the radially projecting elements of the valve member.

5. A closure device as set forth in claim 1 wherein the valve member includes elements radiating from a central valve section, said elements being radially yieldable to facilitate assembly of the valve member with the fitting extension.

6. A closure device as set forth in claim 1 wherein the fitting and valve members are each of one piece molded plastic construction.

7. A closure device as set forth in claim 1 wherein the shiftable valve member comprises a central valve section for engaging the valve seat in the fitting and a plurality of integral arms radiating from said central valve section.

8. A closure device as set forth in claim 1 wherein the fitting includes an annular section provided with a circumferential groove for accommodating a panel.

9. A closure device as set forth in claim 1 wherein the peripheral panel interlocking means includes an annular groove for accommodating a panel and a peripheral surface section of diminishing diameter in the vicinity of said groove to facilitate telescopic association of the fitting within the aperture of a workpiece.

References Cited

UNITED STATES PATENTS

| 1,913,116 | 6/1933 | Haimbaugh | 137—533.17 |
| 2,521,961 | 9/1950 | Bacheller | 137—533.17 XR |
| 2,564,023 | 8/1951 | Miller | 137—533.17 |
| 2,904,065 | 9/1959 | Butlin | 137—454.4 |
| 3,364,941 | 1/1968 | Harder | 137—223 XR |
| 3,422,837 | 1/1969 | Boyer et al. | 137—223 XR |

FOREIGN PATENTS 745,754  2/1956  Great Britain.

ROBERT G. NILSON, Primary Examiner

U.S. Cl. X.R.

52—743; 137—223, 322, 360, 525, 533.19; 285—194